US007804543B2

(12) United States Patent
Neal et al.

(10) Patent No.: US 7,804,543 B2
(45) Date of Patent: Sep. 28, 2010

(54) METHOD AND APPARATUS FOR PROVIDING ON SCREEN DISPLAY (OSD) DATA AT A COMPUTER FOR DISPLAY ON A MONITOR OVER A TRANSMISSION LINK

(76) Inventors: Greg Neal, 17595 Blue Jay Dr., Morgan Hill, CA (US) 95037; Anders Frisk, 2391 Sharon Rd., Menlo Park, CA (US) 94025

( * ) Notice: Subject to any disclaimer, the term of this patent is extended or adjusted under 35 U.S.C. 154(b) by 1378 days.

(21) Appl. No.: 11/233,497

(22) Filed: Sep. 21, 2005

(65) Prior Publication Data

US 2006/0256125 A1 Nov. 16, 2006

Related U.S. Application Data

(60) Provisional application No. 60/657,788, filed on Mar. 1, 2005.

(51) Int. Cl.
*H04N 5/50* (2006.01)

(52) U.S. Cl. ...................... 348/569; 348/582; 348/180; 715/805; 345/594

(58) Field of Classification Search ................ 348/569, 348/180, 182, 184, 177, 582; 345/594; 715/805, 715/762, 764, 765, 810
See application file for complete search history.

(56) References Cited

U.S. PATENT DOCUMENTS

| | | | | |
|---|---|---|---|---|
| 6,348,952 | B1 * | 2/2002 | Jeong | 348/569 |
| 6,462,746 | B1 * | 10/2002 | Min et al. | 345/545 |
| 6,570,626 | B1 * | 5/2003 | Mendenhall et al. | 348/569 |
| 6,747,688 | B1 * | 6/2004 | Kang | 348/182 |
| 7,006,151 | B2 * | 2/2006 | Dieterich | 348/565 |
| 7,151,967 | B2 * | 12/2006 | Chen et al. | 700/56 |

* cited by examiner

*Primary Examiner*—David L Ometz
*Assistant Examiner*—Jean W Désir
(74) *Attorney, Agent, or Firm*—Christensen O'Connor Johnson Kindness PLLC

(57) ABSTRACT

A method for receiving OSD data over from a computer for display on a monitor over a transmission link that includes, launching an OSD application on the computer; receiving an OSD control command at the computer; encoding the OSD control command by the OSD application; converting the encoded OSD control command into an OSD data packet; converting the OSD data packet into at least two OSD pixel patterns, sending the two OSD pixel patterns over the transmission link to the monitor, and displaying the OSD.

19 Claims, 10 Drawing Sheets

| Name | Command | Data 0 | Data 1 | Data 2 |
|---|---|---|---|---|
| Brightness | 0x10 | 0 – 0xff | ~Data 0 | Data 0 << 1 |
| Contrast | 0x20 | 0 – 0xff | ~Data 0 | Data 0 << 1 |
| Auto geometry | 0x30 | 0x55 | ~Data 0 | Data 0 << 1 |
| Auto color balance | 0x40 | 0xaa | ~Data 0 | Data 0 << 1 |
| Display HTotal | 0x50 | Low byte | High byte | Data 0 XOR Data 1 |
| Display Format | 0x60 | | | |
| Volume | 0x70 | 0 – 0xff Left | 0 – 0xff Right | Data 0 XOR Data 1 |
| Tone | 0x80 | 0 – 0xff Bass | 0 – 0xff Treble | Data 0 XOR Data 1 |

TABLE 3

FIG. 4

METHOD AND APPARATUS FOR PROVIDING ON SCREEN DISPLAY (OSD) DATA AT A COMPUTER FOR DISPLAY ON A MONITOR OVER A TRANSMISSION LINK

CROSS REFERENCE TO RELATED APPLICATIONS

This patent application takes priority under 35 U.S.C. 119 (e) to (i) U.S. Provisional Patent Application No. 60/657,788 filed on Mar. 1, 2005, entitled “METHOD AND APPARATUS FOR TRANSMITTING DATA FROM A COMPUTER TO A MONITOR” by Neal, et al. that is incorporated by reference in its entirety.

BACKGROUND

1. Field of the Invention

The invention describes transmitting data from a computer to a monitor.

2. Description of Related Art

An on-screen display (OSD) is a control panel on a computer monitor or television screen that allows one to select viewing options and/or adjust components of the display, such as brightness, contrast, and horizontal and vertical positioning. On a computer monitor, the OSD is usually activated by buttons on the bottom of the monitor. As an example, one button may bring up a display of the brightness and contrast levels, which may be adjusted by pressing the monitor’s up or down arrow buttons. Although useful in providing real time user input for modifying a monitor’s display characteristics (brightness, contrast, etc.) conventional monitor OSDs significantly increase the manufacturing cost of the monitor due to the relatively large amount of on board memory and processing resources required to implement the OSD.

What is needed is a simple yet efficient and cost effective way to implement a monitor OSD.

SUMMARY OF THE INVENTION

Broadly speaking, the invention relates to a customizable on screen display (OSD) suitable for calibrating a monitor that is provided by an OSD application resident on a computer only such that essentially no monitor memory or processing resources are used. In this way, a user can customize the OSD to suit any particular monitor as deemed appropriate.

In one embodiment, a method for providing on screen display (OSD) data at a computer for display on a monitor over a transmission link is described. The method includes the following operations, launching an OSD application that is resident on the computer only and therefore does not require any monitor processing or monitor memory resources, receiving an OSD control command, encoding the OSD control command by the OSD application, converting the encoded OSD control command into an authenticable OSD data packet wherein the authenticable OSD data packet can be included in a video data stream and still remain identifiable as the OSD data packet, converting the OSD data packet into at least two OSD pixel patterns that are coded differently, sending the at least two OSD pixel patterns over the transmission link to the monitor, and displaying the OSD. In another embodiment, computer program product for receiving on screen display (OSD) data from a computer for display on a monitor over a transmission link is disclosed. The computer program product includes computer code for launching an OSD application that is resident on the computer only and therefore does not require any monitor processing or monitor memory resources, computer code for receiving an OSD control command, computer code for encoding the OSD control command by the OSD application, computer code for converting the encoded OSD control command into an authenticable OSD data packet wherein the authenticable OSD data packet can be included in a video data stream and still remain identifiable as the OSD data packet, computer code for converting the OSD data packet into at least two OSD pixel patterns that are coded differently, computer code for sending the at least two OSD pixel patterns over the transmission link to the monitor, computer code for displaying the OSD, and computer readable medium for storing the computer code.

In yet another embodiment, a system for providing screen display (OSD) data at a computer having a processor unit and a memory unit for storing an OSD application program executed by processor the for display on a monitor over a transmission link wherein the OSD application program is resident only on the computer and therefore does not require any monitor processing or monitor memory resources for execution is disclosed. The system includes a user interface for providing an OSD control command in response to a user provided OSD input, an OSD control command encoder unit coupled to the user interface for encoding the OSD control command, a packetizer coupled to the OSD control command encoder unit for converting the encoded OSD control command into an authenticable OSD data packet wherein the authenticable OSD data packet can be included in a video data stream and still remain identifiable as the OSD data packet, and an OSD pixel pattern generator unit coupled to the packetizer for converting the OSD data packet into at least two OSD pixel patterns that are coded differently and sending the at least two OSD pixel patterns over the transmission link to the monitor.

In another embodiment, a user customizable monitor calibration on screen display (OSD) suitable for calibrating colors displayed by a monitor includes a calibration block used for calibration of the monitor that includes a primary rectangle at a first co-ordinate position corresponding to a set known color value, and a secondary rectangle corresponding to the primary rectangle used to confirm the set known color value stored in the primary rectangle wherein the primary and the secondary rectangles each represent the same set known color value but encoded differently from each other.

Other aspects and advantages of the invention will become apparent from the following detailed description taken in conjunction with the accompanying drawings which illustrate, by way of example, the principles of the invention.

BRIEF DESCRIPTION OF THE DRAWINGS

FIG. 4 shows a Table 3 representing a number of exemplary data packet fields and their respective data values.

DESCRIPTION OF AN EMBODIMENT

Figure 1:
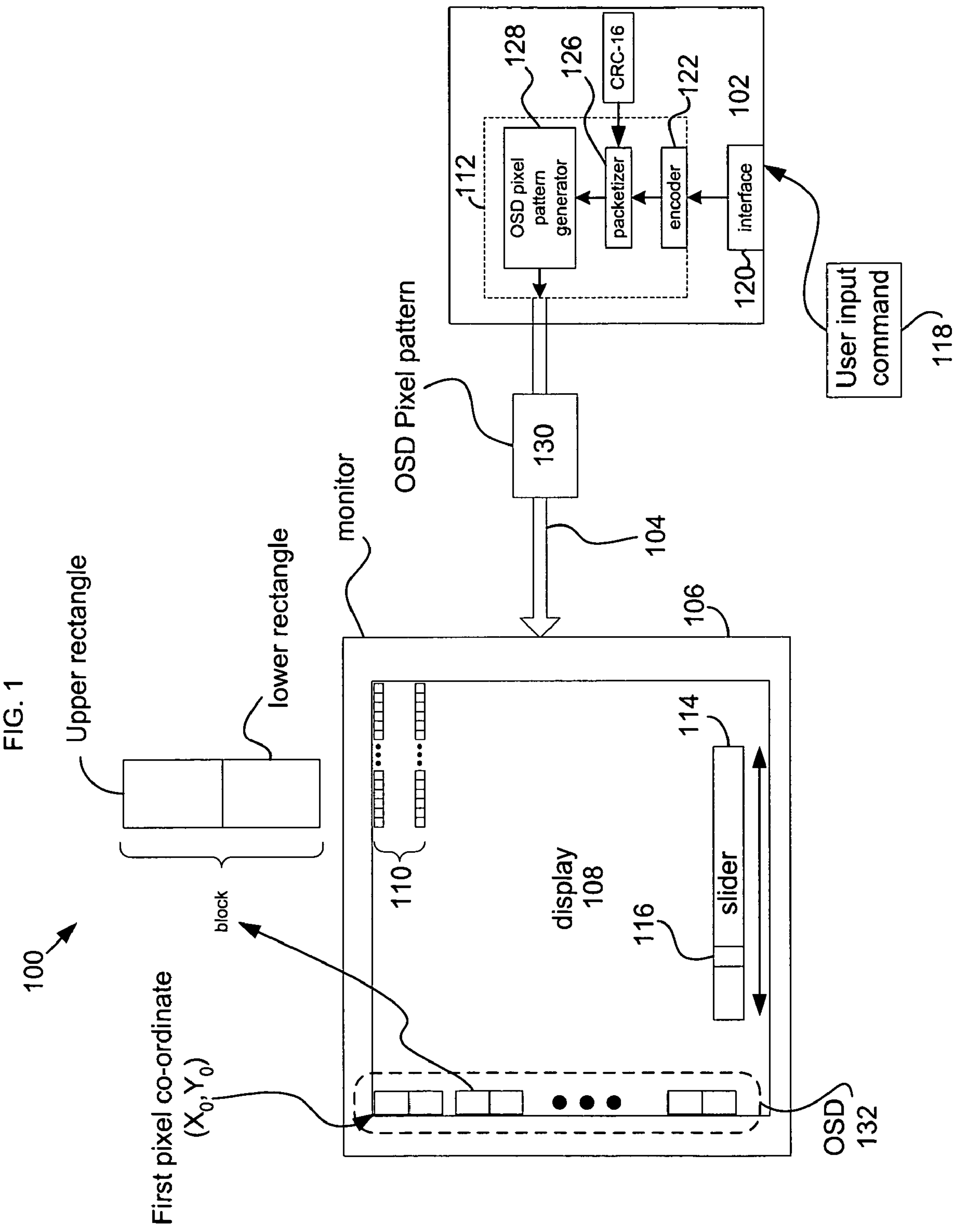
FIG. 1 shows a system in accordance with an embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention.

An on-screen display (OSD) is a control panel on a computer monitor or television screen that allows one to select viewing options and/or adjust components of the display, such as brightness, contrast, and horizontal and vertical positioning. In contrast to conventionally configured monitor OSDs that rely solely upon monitor processing and memory resources, the inventive monitor OSD is implemented as software on a host computer coupled to the monitor that is then sent to the monitor by way of a conventional video data stream. Since the software can be included in a disc distributed with a particular monitor, it is contemplated that almost no additional cost is incurred. In addition, substantial savings can be realized since all the OSD generating hardware, any memory space in the form or Read Only Memory (or ROM) to hold any required firmware and Random Access Memory (or RAM) space to generate the OSD resides in the host computer and not, as in conventionally configured monitors, in the monitor.

Since no input keys are required by the inventive OSD, the style and functionality of the OSD can be changed very easily (using, for example, customizable "skins") since no knowledge of, or access to, the video card within the computer is needed. Additional advantages include the fact that no non-volatile memory is required in the monitor and no access to any DDC serial communications connection between the computer and the monitor is required.

In one embodiment of the invention, based upon user supplied input, a PC application resident on a host computer controls the transmission of small data packets in the form of an OSD pixel pattern embedded in a video data stream sent from the host computer to a monitor coupled thereto. Each data packet can used to represent the value of the control last changed, or initialization data. At the monitor, firmware receives and processes the embedded data packets to display the OSD that can take any number of forms. For example, in one case, the displayed OSD takes the form of a number (such as 10) of small rectangles of color placed along a left edge of the display.

Using an on screen control input icon (such as a brightness slider and/or a close button), if a control input is continuously changed, the data packet is updated accordingly (approximately 10 times a second, for example). Once a control input is determined to be unchanged for a predetermined length of time, the corresponding displayed rectangles continue to display for preset period of time (e.g., approximately ½ second) after which they are no longer displayed on the monitor.

The invention will now be described in terms of a system based upon a host computer and a display monitor coupled thereto by way of a video data connection, such as, for example, a VGA cable. Although described in terms of a computer system, the invention is well suited for any application where an OSD is desired to provide real time user input to modify monitor display characteristics. In this way, the invention provides for a low cost, easily implemented computer based OSD suited for use with any appropriately configured monitor.

Accordingly, FIG. 1 shows a system 100 in accordance with an embodiment of the invention. The system 100 includes a computer 102 coupled by way of a cable 104 to a monitor 106 having a display area 108 used to display an image by way of a number of pixels 110 arranged in rows and columns using image data provided by the computer 102 in the form of a pixel data word for each of the pixels 110.

Figure 2:
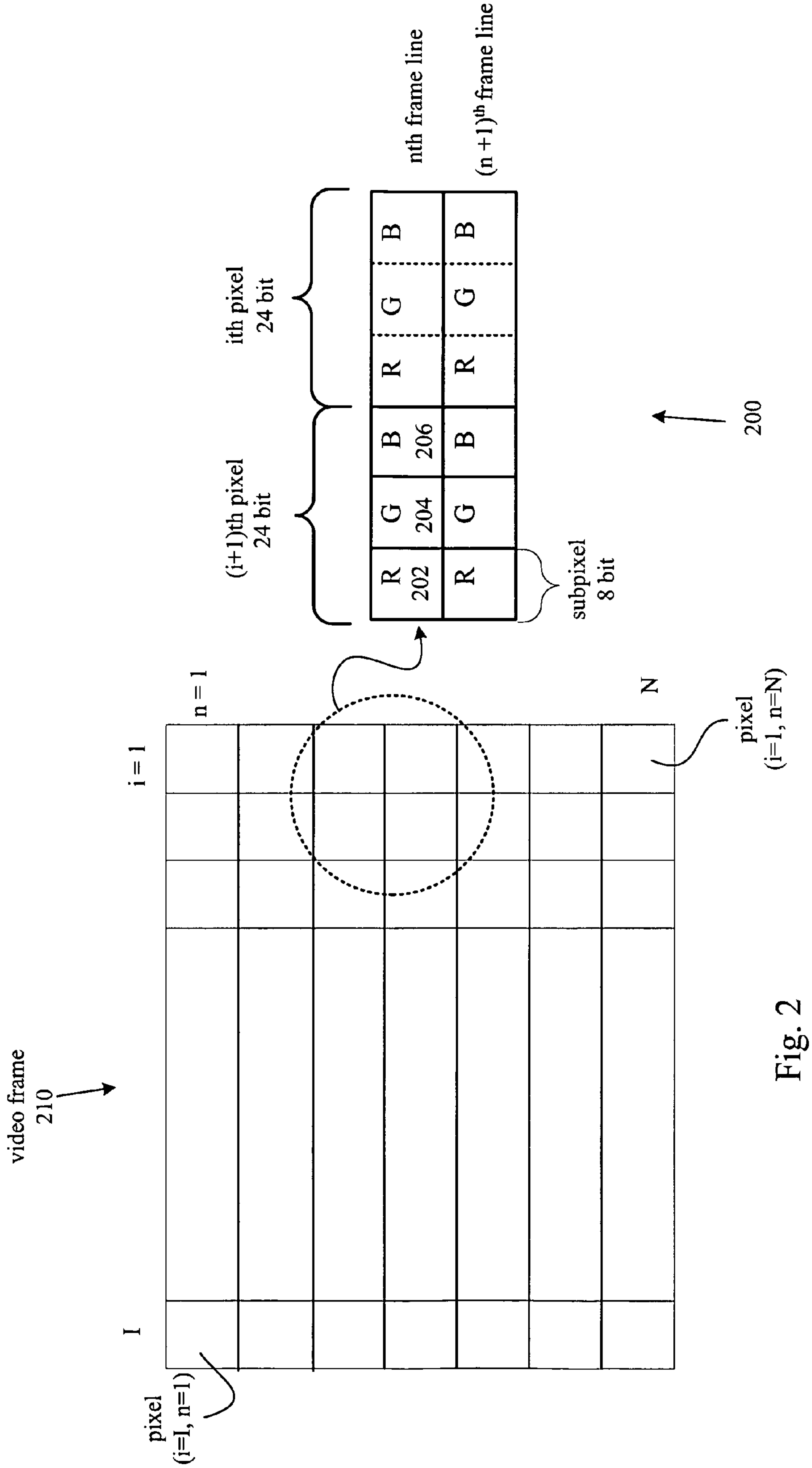
FIG. 2 shows a representative pixel data word in accordance with the invention is shown suitable for an RGB based 24 bit (or true color) system

FIG. 2 shows a representative pixel data word 200 in accordance with the invention is shown suitable for an RGB based 24 bit (or true color) system. It should be noted, however, that although an RGB based system is used in the subsequent discussion, the invention is well suited for any appropriate color space. Accordingly, the pixel data word 200 is formed of 3 sub-pixels, a Red (R) sub-pixel 202, a Green (G) sub-pixel 204, and a Blue (B) sub-pixel 206 each sub-pixel being n bits long for a total of 3n bits. In this way, each sub-pixel is capable of generating $2^n$ (i.e., 256) voltage levels (sometimes referred to as bins when represented as a histogram). For example, in a 24 bit color system, n=8 and the B sub-pixel 206 can be used to represent 256 levels of the color blue by varying the transparency of the liquid crystal which modulates the amount of light passing through the associated blue mask whereas the G sub-pixel 204 can be used to represent 256 levels of the color green in substantially the same manner.

It is for this reason that display monitors are structured in such a way that each display pixel is formed of the 3 sub-pixels 202-206 which taken together form approximately 16 million displayable colors (when n=8). Using an active matrix display, for example, a video frame 210 having N frame-lines each of which is formed of I pixels, a particular pixel data word can be identified by denoting a frame-line number n (from 1 to N) and a pixel number i (from 1 to I).

Referring back to FIG. 1, for the remainder of this discussion, the pixels 110 are arranged such that a first pixel has a first pixel co-ordinate ($X_0$, $Y_0$) which in this case is located at the leftmost and uppermost corner of the display area 108. It should be noted, however, that this particular arrangement is only used in this discussion in order to simplify the discussion of the invention and should not be construed as limiting either the scope or intent of the invention thereof. During operation, the monitor 106 is powered on and/or the computer 102 is booted up (in any combination) after which an OSD application 112 is launched on the computer 102. In the described embodiment, the OSD application 112 provides essentially the same functionality as does a conventionally configured monitor based OSD but is resident on the computer 102 only and therefore does not require any monitor processing or memory resources. After the OSD application 112 is launched, the OSD application 112 generates a customizable, graphical user interface (GUI) having a number of user selectable control icons each used to provide user inputs to the OSD application. By customizable it is meant that the GUI can take any number of forms deemed suitable by a user, computer manufacturer, monitor manufacturer, etc. since the invention takes advantage of the flexibility provided by the use of the computer to generate the GUI and not a static, unchanging OSD as provided in conventional monitor OSDs. In this way, a user, computer manufacturer, monitor manufacturer, etc., can provide, for example, a number of OSD "skins" that can be selected and swapped at will in any configuration deemed suitable.

Figure 3:
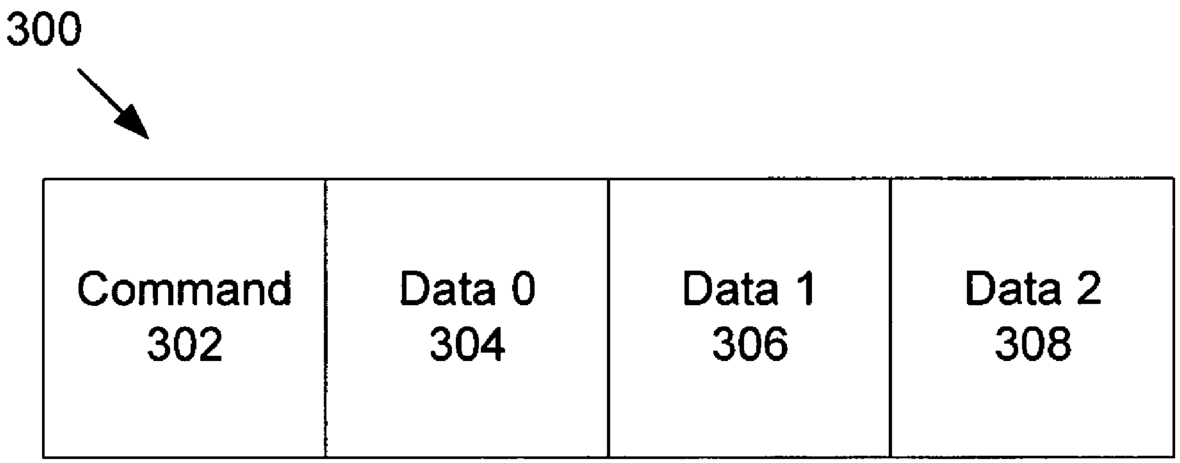
FIG. 3 shows a representative command data word.

Typically, the user selectable control icons are each associated with a particular monitor display characteristic such as brightness, contrast, horizontal and vertical position, clock phase, color temperature, auto adjust features, and the like. In the embodiment shown in FIG. 1, the graphical user interface (GUI) takes the form of a slide-able bar 114 having a slider icon 116 as the selectable control icon that can be moved to the left or right (or up and down for that matter) in order to increase or decrease a particular display characteristic (which in this case happens to be brightness). When a user desires to change a particular display characteristic (brightness in this case), the user moves the slider icon 116 to the right to increase brightness or the left to decrease brightness. In so doing, a user provided input command 118 is generated and passed to an interface 120 that provides an input to the OSD application 112. At the OSD application 112, the input command 118 is converted by way of a OSC command encoder unit 122 into an appropriately formatted command instruction 124 an example of which is shown in FIG. 3 having a command data portion 302 associated with the display characteristic represented by the GUI 114 and a number of associated data portions 304, 306, and 308 each representative of a command input value. In this particular case, the data portions 304-308 are taken as absolute values but can, of course, be any appropriate format.

Referring back to FIG. 1, once the command encoder unit 122 has encoded the input command, the encoded input command is passed to an OSD data packetizer unit 126 that converts the encoded input command to an authenticable OSD data packet. By authenticable, it is meant that the OSD data packet can reliably be authenticated as being an OSD data packet thereby allowing the OSD data packets to be included in a conventional video data stream from the computer 102 to the monitor 106 and still remain identifiable as such. In the described embodiment, the authentication is provided by the addition of a 2 byte CRC-16 checksum (making for a total of 6 bytes for the data packet) that essentially assures that a data packet matching the appropriate CRC-16 checksum is in fact an OSD data packet. The bits will represent 6 bytes arranged such that the least significant bit (LSB) is in a first bit location where the data packet is further formatted as follows:

COMMAND PACKET FORMAT

| BYTE NO. | FIELD |
|---|---|
| 0 | COMMAND |
| 1 | DATA 0 |
| 2 | DATA 1 |
| 3 | DATA 2 |
| 4 | CHECKSUM |
| 5 | CHECKSUM |

The OSD data packet is then passed to a pixel pattern generator 128 that converts the OSD data packet into a corresponding pixel pattern 130 that is then sent by way of the cable 104 to the monitor 106 for display as an OSD 132 on the display 108 described in more detail below. In this particular case, the OSD 132 is displayed for a predetermined length of time, such as 0.5 seconds. Once a control stops changing the rectangles will continue to display for approximately 0.5 seconds after which they will be no longer displayed.

FIG. 4 shows a Table 3 representing a number of exemplary data packet fields and their respective data values. It should be noted that the contents of the data packet can be updated based upon based upon further user provided input events. For most applications, a suitable update can occur approximately 10 times a second. Since the checksum uses CRC-16, the checksum of the first 4 bytes equals byte 5 and 6. In this way, a data packet will only be valid if all of the following conditions are met:

A) all 8 bit color values are valid,

B) the data packet from the top blocks is identical to the one from the bottom blocks, C) the checksum is correct; and D) the content of the packet is valid.

It is contemplated that the data packet can used to represent the value of the control last changed or initialization data. If a control is continuously changed, the data packet will be updated accordingly (such as approximately 10 times a second). Once a control stops changing the rectangles will continue to display for approximately ½ second, after which they are no longer displayed.

Figure 5A:
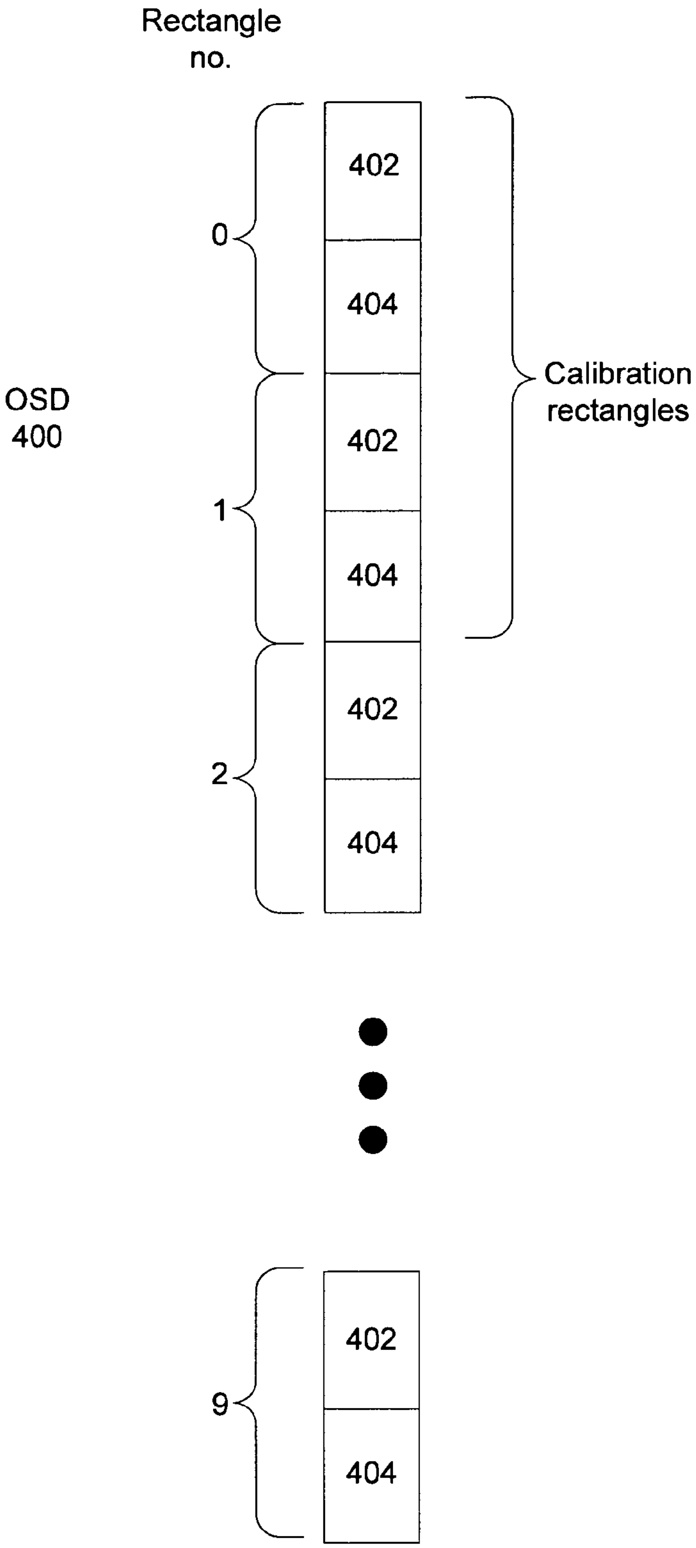
FIG. 5A shows an exemplary displayed OSD in accordance with an embodiment of the invention.

FIG. 5A shows an exemplary displayed OSD 400 in accordance with an embodiment of the invention. The OSD 400 is formed of a number of primary blocks 402 each of which has an associated secondary block 404 used to confirm the color values stored in the primary rectangles 402. In the described embodiment, the number of primary rectangles 402 is set to 10 along with a corresponding number of secondary rectangles 404. However, any suitable number of primary and secondary rectangles can be displayed dependent upon the size, resolution, etc. of the monitor. Typically, the first two rectangles are calibration rectangles that are used for calibration of the monitor in that color values associated with each of the calibration rectangles are set to known values which are then used to affirm that the monitor is appropriately calibrated.

Figure 5B:
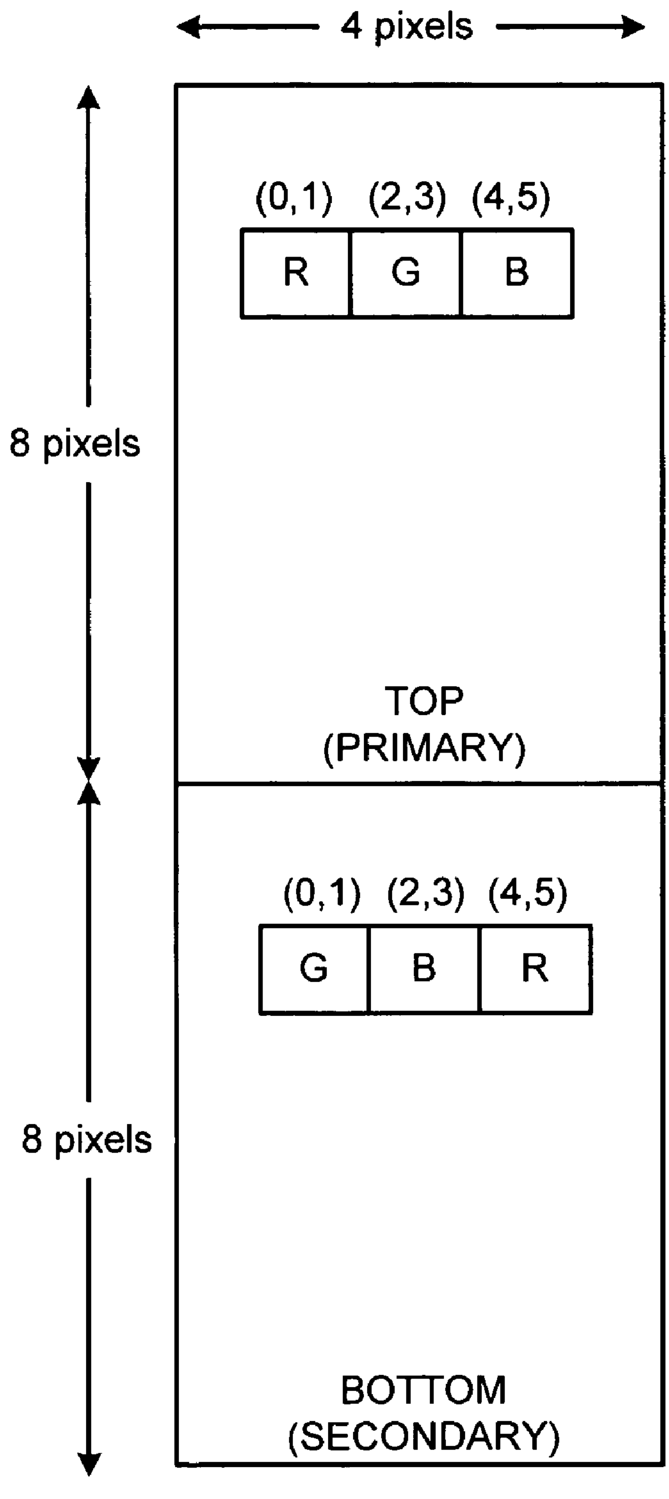
FIG. 5B shows a more detailed view of a primary/secondary rectangle pair in accordance with an embodiment of the invention.

FIG. 5B shows a more detailed view of a block 500 having top portion and a bottom portion (also referred to as top rectangle 502 and bottom rectangle 504 based upon their respective displayed positions) in accordance with an embodiment of the invention that each represent the same data, albeit encoded differently. As mentioned above, when the block 500 is located at a first co-ordinate position (i.e., positions 0 and 1), the block 500 is used for the calibration of the offset and gain of the total video path. For example, when used for calibration, both blocks of each rectangle will be the same such as block 0 will have an 8 bit value of 224 and block 1 will have an 8 bit value of 32 where the vertical positions of the top of the rectangles is given by (1):

$$Y=(VertRes/10)*N+(VertRes/20),\text{ where} \quad (1)$$

Y=Vertical position (0 at the top),

VertRes=display vertical resolution.

N=rectangle number (0 to 9).

The remaining rectangles (eight in this example) carry data. Of each rectangle, the top rectangle is 4 pixels wide and 8 pixels high and the corresponding color with be represented as 6 bits, 2 bits in each of Red, Green, and Blue as shown in Table 1.

TABLE 1

TOP RECTANGLE

| COLOR | BITS |
|---|---|
| RED | 0, 1 |
| GREEN | 2, 3 |
| BLUE | 4, 5 |

In the described embodiment, each color is coded by to an 8 bit value as shown in Table 2.

TABLE 2

| TOP BLOCK | |
|---|---|
| Pixel value | code |
| 8-55 | 00 |
| 72-119 | 01 |
| 136-183 | 10 |
| 200-247 | 11 |

All other values are invalid.

Of each rectangle, the bottom is 4 pixels wide and 8 pixels high, placed directly under the top having an associated color represented by 6 bits, 2 bits in each of R, G, & B, as shown in Table 3.

TABLE 3

| BOTTOM BLOCK | |
|---|---|
| COLOR | BITS |
| RED | 4, 5 |
| GREEN | 0, 1 |
| BLUE | 2, 3 |

Each color will be coded by its 8 bit value as shown in Table 4.

TABLE 4

| BOTTOM BLOCK | |
|---|---|
| Pixel value | code |
| 8-55 | 10 |
| 72-119 | 11 |
| 136-183 | 00 |
| 200-247 | 01 |

All other values are invalid. Furthermore, rectangle 2 represents bits 0 to 5, rectangle 3 will represent bits 7 to 11 and so on.

Figure 6:
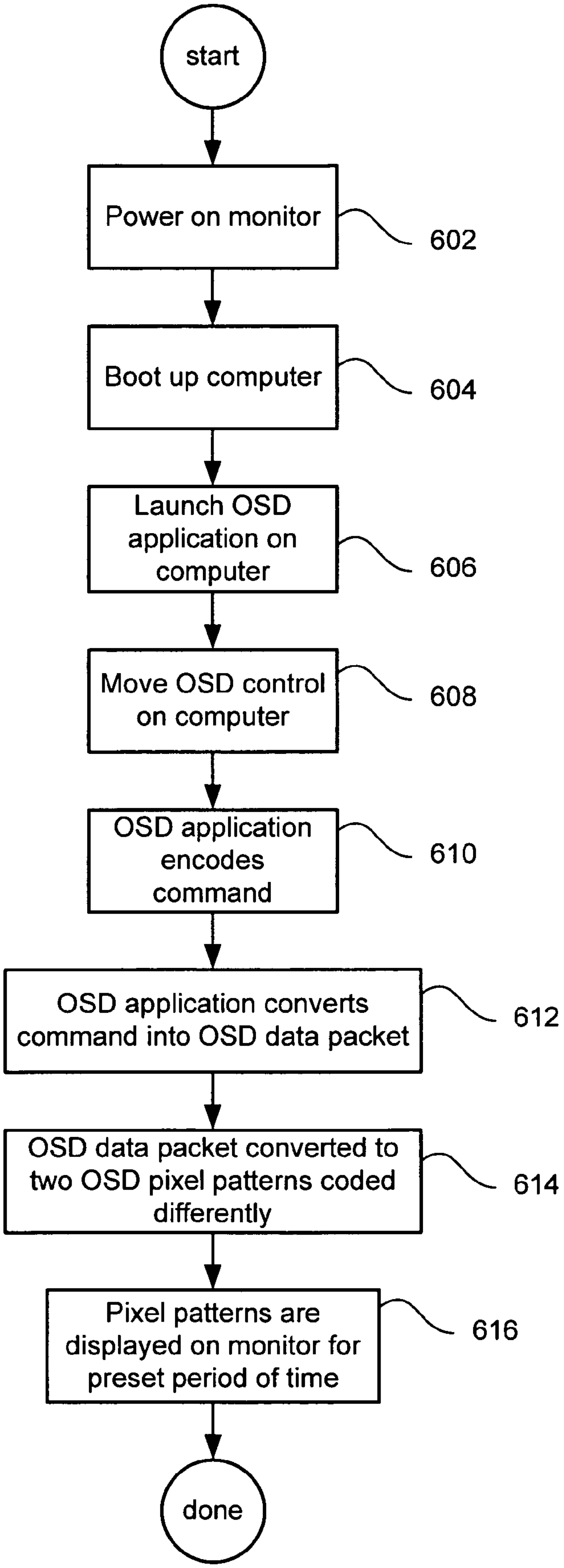
FIG. 6 shows a flowchart detailing a process for a computer-side generation of an OSD pixel pattern in accordance with an embodiment of the invention.

FIG. 6 shows a flowchart detailing a process 600 for a computer-side generation of an OSD pixel pattern in accordance with an embodiment of the invention. Accordingly, the process 600 begins at 602 and 604 by powering up the monitor and/or booting up the computer in any combination. Subsequent to the powering up and/or booting up, an OSD application is launched on the computer at 606 that provides a graphical user interface (GUI) for display on the monitor having a number of user interactive icon. Using the GUI, a user provides a OSD icon movement command by moving clicking and dragging a cursor (such as a mouse) at 608 and at 610, the OSD application encodes the movement command which is then converted at 612 into an authenticable OSD data packet. In the described embodiment, the authenticability is provided by adding checksum bits consistent with a CRC-16 protocol. At 614, the OSD data packet is converted to at least two pixel patterns that are coded differently which are displayed on the monitor at 616.

Figure 7:
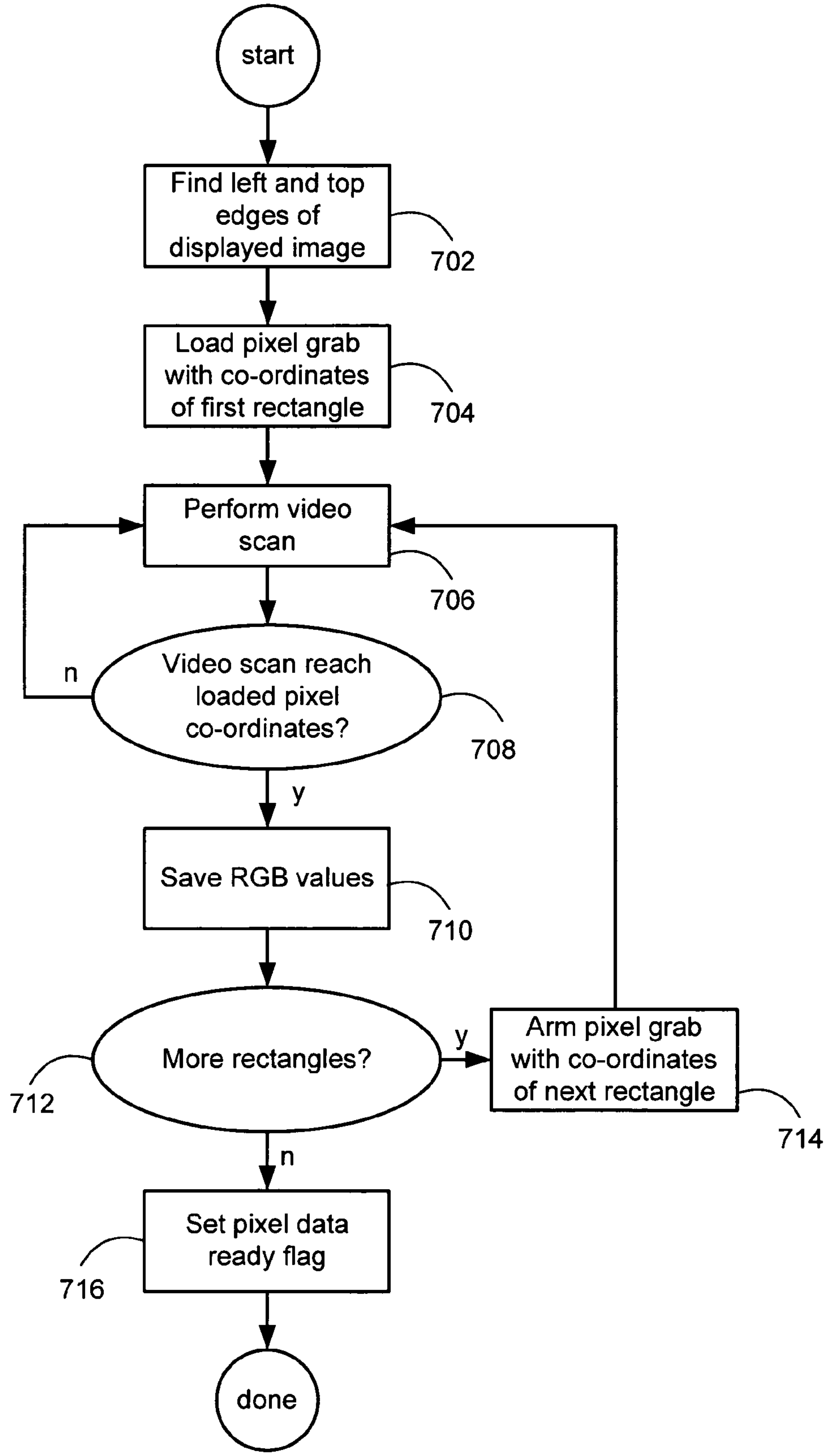
FIG. 7 shows a process that runs in the monitor background while waiting for a valid OSD data packet.

FIG. 7 shows a process 700 that runs in the monitor background while waiting for a valid OSD data packet. The process 700 includes the following operations, at 702, a feature edge detector finds a left and top edges of a displayed image and at 704, the pixel co-ordinates of the first found rectangle is loaded into a pixel grab buffer. Next at 706, a video scan is performed and at 708 a determination is made whether or not the video scan has reached the stored pixel co-ordinates. When the pixel scan has reached the stored pixel co-ordinates, then at 710, the RGB values of the stored pixel co-ordinates are stored and at 712 a determination is made if there is an additional rectangle. If there is an additional rectangle then at 714, the pixel co-ordinates of the new rectangle are loaded in the pixel grab buffer and control is passed back to 706. On the other hand, if there are no additional rectangles, then the set pixel data flag ready flat is set at 716.

Figure 8:
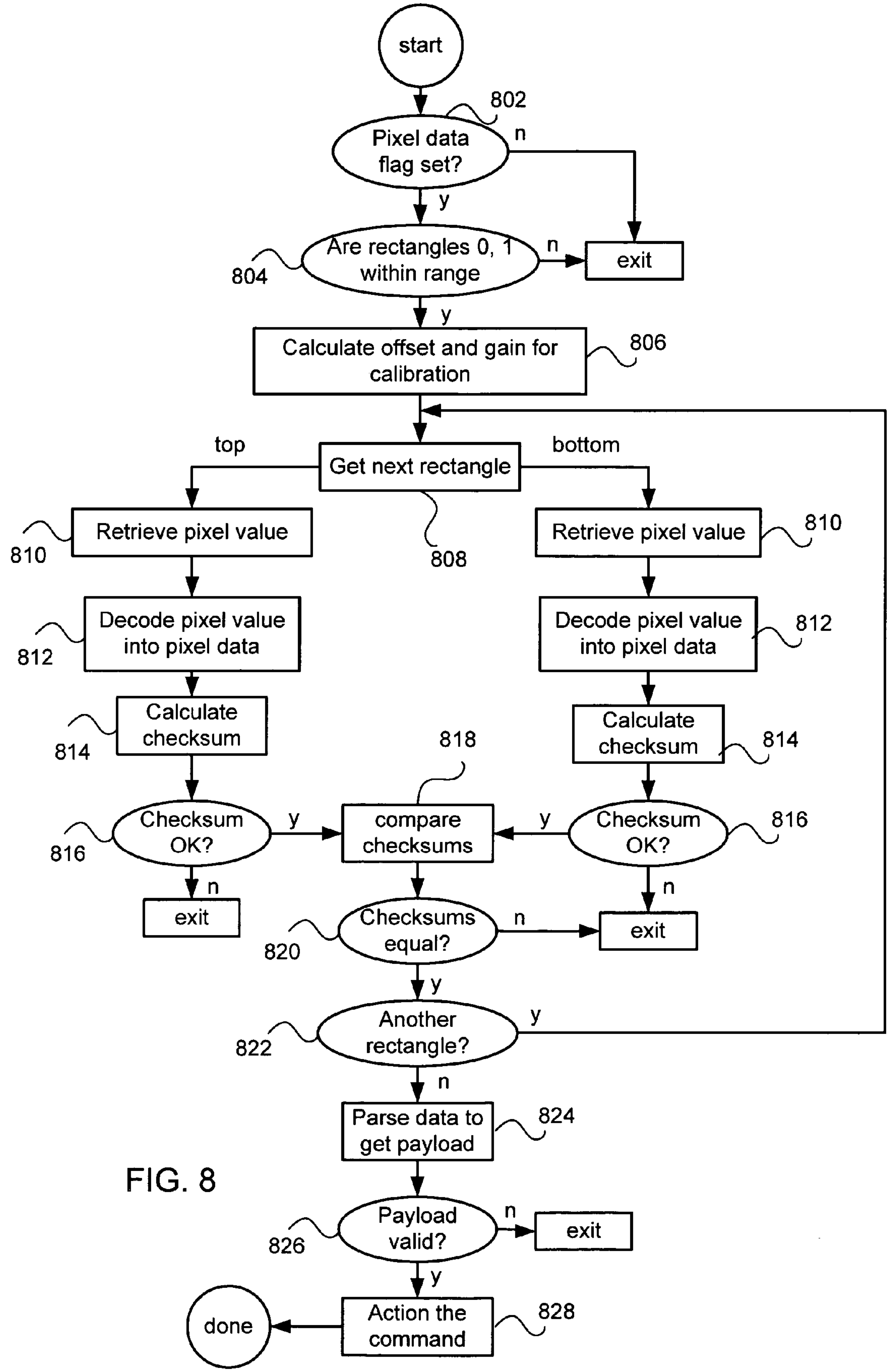
FIG. 8 shows a flowchart detailing a process for providing an OSD data packet to a monitor based upon a user provided input command.

FIG. 8 shows a flowchart detailing a process 800 for providing an OSD data packet to a monitor based upon a user provided input command. The process 800 begins at 802 that exits the process 800 when a pixel data flag is determined to not be set. Next at 804, when the pixel data flag has been determined to be set, then a determination is made whether or not the calibration rectangles are within the predescribed range of values. If the calibration rectangles are not within range, then the process stops, otherwise an offset and gain are calculated based upon the values of the calibration rectangles at 806. At 808, a next rectangle is located and concurrently for a top and a bottom rectangle, at 810 pixel data is retrieved and at 812 the retrieved pixel data is decoded while at 814, the checksum is calculated. If, at 816, the checksum is determined to not be valid, then in either case, the process stops, otherwise, the two checksums are compared at 818. If, at 820, the two checksums are determined to be equal, then a determination is made at 822 if there is an additional rectangle, otherwise if the two checksums are not equal, then processing stops.

If it has been determined at 822 that there is an additional rectangle, then control is passed back to 808, otherwise at 824 the command data is parsed to obtain the payload portion of the command. Next at 826, a determination is made if the data command payload is valid or not. If the payload is not valid, then the process stops, otherwise, at 828, the action associated with the command is executed.

Figure 9:
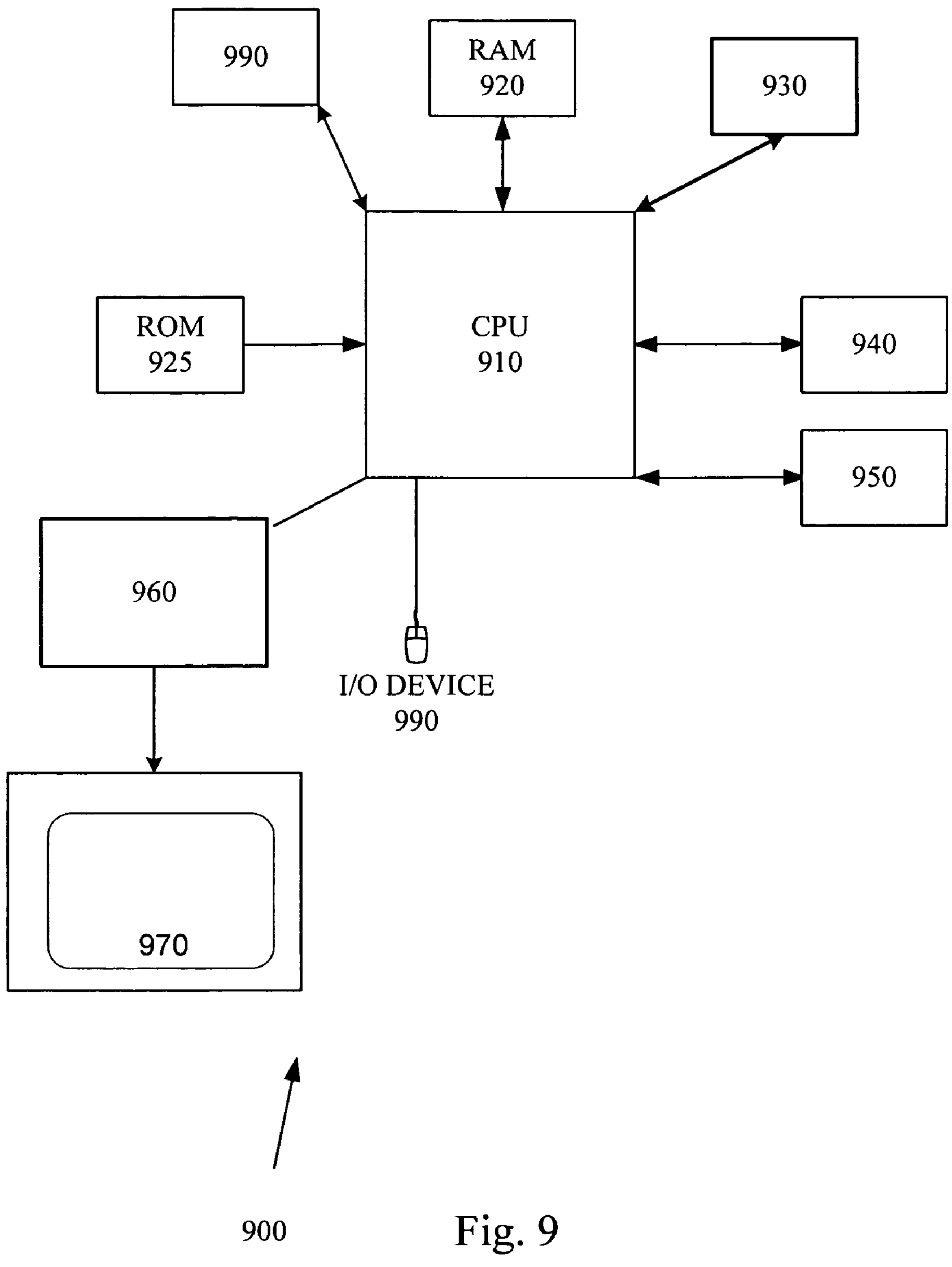
FIG. 9 illustrates a system employed to implement the invention.

FIG. 9 illustrates a system 900 employed to implement the invention. Computer system 900 is only an example of a graphics system in which the present invention can be implemented. System 900 includes central processing unit (CPU) 910, computer-readable storage media such as random access memory (RAM) 920 and read only memory (ROM) 925, one or more peripherals 930, graphics controller 960, primary computer-readable storage devices 940 and 950, and digital display unit 970. CPUs 910 are also coupled to one or more input/output devices 990. Graphics controller 960 generates analog image data and a corresponding reference signal, and provides both to digital display unit 970. The analog image data can be generated, for example, based on pixel data received from CPU 910 or from an external encode (not shown).

In one embodiment, the analog image data is provided in RGB format and the reference signal includes the $V_{SYNC}$ and $H_{SYNC}$ signals well known in the art. However, it should be understood that the present invention can be implemented with analog image, digital data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A computer-implemented method for providing on screen display (OSD) data at a computer for display on a monitor over a transmission link, comprising:

launching an OSD application resident on the computer;

receiving an OSD control command;

encoding the OSD control command by the OSD application;

converting the encoded OSD control command into an authenticable OSD data packet;

converting the authenticable OSD data packet into at least two OSD pixel patterns that are coded differently; and sending the at least two OSD pixel patterns over the transmission link to the monitor.

2. The computer-implemented method as recited in claim 1, further comprising:

rendering a customizable graphical user interface (GUI) for display on the monitor having a number of user interactive icons that are each associated with a particular monitor display characteristic that includes brightness, contrast, horizontal and vertical position, clock phase, color temperature, and auto adjust features; and receiving a user generated OSD icon movement command at one or more of the user interactive icons.

3. The computer-implemented method as recited in claim 2, wherein the authenticable OSD data packet comprises:

a command data portion associated with the display characteristic represented by the GUI; and a number of associated data portions each representative of a command input value.

4. The computer-implemented method as recited in claim 1, wherein converting the encoded OSD control command into an authenticable OSD data packet further comprises adding checksum bits consistent with a CRC-16 protocol.

5. The computer-implemented method as recited in claim 1, further comprising transmitting for display the OSD data represented by the at least two OSD pixel patterns by displaying a plurality of primary blocks, each of which is sub-divided into sub-rectangles used to confirm color values stored in the primary blocks.

6. The computer-implemented method as recited in claim 5, wherein a first two primary blocks are calibration rectangles that are used for calibration of the monitor.

7. The computer-implemented method as recited in claim 6, further comprising:

setting color values associated with each of the calibration rectangles to known values that are, in turn, used to calibrate the monitor.

8. The computer-implemented method as recited in claim 5, wherein the sub-rectangles include a top sub-rectangle and a bottom sub-rectangle that represent a same color data encoded differently.

9. A computer-readable storage medium having computer-executable instructions for providing on screen display (OSD) data at a computer for display on a monitor over a transmission link stored thereon that, when executed on the computer, cause the computer to:

launch an OSD application that is resident on the computer;

receive an OSD control command;

encode the OSD control command by the OSD application;

convert the encoded OSD control command into an authenticable OSD data packet;

convert the authenticable OSD data packet into at least two OSD pixel patterns that are coded differently; and send the at least two OSD pixel patterns over the transmission link to the monitor for display.

10. The computer-readable storage medium as recited in claim 9, wherein the computer-executable instructions, when executed on the computer, further cause the computer to:

provide commands to create a customizable graphical user interface (GUI) for display on the monitor having a number of user interactive icons that are each associated with a particular monitor display characteristic that includes brightness, contrast, horizontal and vertical position, clock phase, color temperature, and auto adjust features; and receive a user generated OSD icon movement command at one or more of the user interactive icons.

11. The computer-readable storage medium as recited in claim 10, wherein the computer-executable instructions cause the computer to create the authenticable OSD data packet that includes:

a command data portion associated with the display characteristic represented by the GUI; and a number of associated data portions each representative of a command input value.

12. The computer-readable storage medium as recited in claim 9, wherein the computer-executable instructions that cause the computer to convert the encoded OSD control command into the authenticable OSD data packet further cause the computer to add checksum bits consistent with a CRC-16 protocol.

13. The computer-readable storage medium as recited in claim 9, wherein the computer-executable instructions that cause the computer to display the OSD pixel patterns further cause the computer to display a plurality of primary blocks each of which is sub-divided into sub-rectangles used to confirm color values stored in the primary blocks.

14. The computer-readable storage medium as recited in claim 13, wherein a first two primary blocks are calibration rectangles that are used for calibration of the monitor.

15. The computer-readable storage medium as recited in claim 14, wherein the computer-executable instructions, when executed on the computer, further cause the computer to set color values associated with each of the calibration rectangles to known values that are, in turn, used to calibrate the monitor.

16. The computer-readable storage medium as recited in claim 13, wherein the sub-rectangles include a top sub-rectangle and a bottom sub-rectangle that represent the same color data encoded differently.

17. A system for providing on screen display (OSD) in a computer having a processor and a memory, comprising:

a user interface component operable using the processor to provide an OSD control command in response to a user-provided OSD input;

an OSD application program component resident on the computer and operable using the processor to provide control signals to an OSD control command encoder component coupled to the user interface component and operable using the processor to encode the OSD control command;

a packetizer component coupled to the OSD control command encoder component and operable using the processor to convert the encoded OSD control command into an authenticable OSD data packet; and an OSD pixel pattern generator component coupled to the packetizer and operable using the processor to convert the OSD data packet into at least two OSD pixel patterns that are coded differently and sending the at least two OSD pixel patterns over the transmission link to the monitor.

18. The system as recited in claim 17, wherein the OSD comprises:

a calibration block used for calibration of the monitor comprising:

a primary rectangle at a first co-ordinate position corresponding to a set known color value; and a secondary rectangle corresponding to the primary rectangle used to confirm the set known color value stored in the primary rectangle wherein the primary and the secondary rectangles each represent the same set known color value but encoded differently from each other.

19. The system as recited in claim 18, wherein the OSD is a user-customizable monitor calibration OSD suitable for calibrating colors displayed by a monitor.

* * * * *